(12) United States Patent
Craig et al.

(10) Patent No.: US 7,191,868 B2
(45) Date of Patent: Mar. 20, 2007

(54) COMBINED SILENCER AND SPARK ARRESTER

(75) Inventors: Jonathan R. Craig, Antrim (IE); Samuel J. Kirkpatrick, Antrim (IE); Graeme H. Mawhinney, Belfast (IE)

(73) Assignee: F.G. Wilson (Engineering) Ltd (IE)

( * ) Notice: Subject to any disclaimer, the term of this patent is extended or adjusted under 35 U.S.C. 154(b) by 363 days.

(21) Appl. No.: 10/323,620

(22) Filed: Dec. 18, 2002

(65) Prior Publication Data

US 2003/0150669 A1    Aug. 14, 2003

(30) Foreign Application Priority Data

Dec. 27, 2001    (GB) ................. 0131009.3

(51) Int. Cl.
*F01N 3/02* (2006.01)
*F01N 3/06* (2006.01)
*F01N 1/08* (2006.01)

(52) U.S. Cl. ............... 181/231; 181/268; 181/269; 181/272; 181/275

(58) Field of Classification Search ............ 181/231, 181/251, 255, 268, 269, 272, 275, 28
See application file for complete search history.

(56) References Cited

U.S. PATENT DOCUMENTS

| | | | |
|---|---|---|---|
| 2,196,920 A | | 4/1940 | Hoyle |
| 3,232,374 A | * | 2/1966 | Powers .................. 181/245 |
| 3,283,847 A | * | 11/1966 | Lentz et al. ............ 181/245 |
| 3,441,105 A | * | 4/1969 | Hubbell ................. 181/282 |
| 3,469,653 A | * | 9/1969 | Vautaw et al. ......... 181/266 |
| 3,507,357 A | * | 4/1970 | Blome .................... 181/282 |
| 3,512,607 A | * | 5/1970 | Hubbell ................. 181/265 |
| 3,583,524 A | * | 6/1971 | Dubois .................. 181/266 |
| 3,898,064 A | | 8/1975 | Tao et al. |
| 3,957,471 A | | 5/1976 | Tamachi et al. |
| 4,004,649 A | | 1/1977 | Shimada |
| 4,006,793 A | * | 2/1977 | Robinson ................ 184/53 |
| 4,113,051 A | | 9/1978 | Moller |
| 4,124,092 A | * | 11/1978 | Kajiya et al. ........... 181/265 |
| 4,218,228 A | | 8/1980 | Hiraoka et al. |
| 4,416,350 A | * | 11/1983 | Hayashi ................. 181/272 |
| 4,846,302 A | * | 7/1989 | Hetherington ......... 181/243 |
| 4,911,262 A | | 3/1990 | Tani et al. |
| 4,961,314 A | * | 10/1990 | Howe et al. ............ 60/288 |

(Continued)

FOREIGN PATENT DOCUMENTS

| | | | |
|---|---|---|---|
| GB | | 635990 | 4/1950 |
| GB | | 1 394 605 | 5/1975 |
| JP | | 55049501 A | * 4/1980 |
| JP | | 57049008 A | * 3/1982 |
| JP | | 3 63-129112 A | 6/1988 |

(Continued)

*Primary Examiner*—Edgardo San Martin
(74) *Attorney, Agent, or Firm*—Finnegan, Henderson, Farabow, Garrett & Dunner

(57) ABSTRACT

A silencer for silencing exhaust gases includes an acoustic resonator chamber that serves as a spark arrester to trap burning carbon particles and prevent them passing to the atmosphere. The silencer has an exhaust gas inlet and an exhaust gas outlet. Exhaust gases pass from the inlet to the outlet through a first passage and into a first chamber. The first chamber communicates with an acoustic resonator chamber by means of a connecting passage. The connecting passage is positioned adjacent the first passage so that sparks in the exhaust enter the acoustic resonator chamber where they are trapped. The silencer thus avoids the need for a separate spark arrester, as required by prior art silencers.

25 Claims, 1 Drawing Sheet

U.S. PATENT DOCUMENTS

| | | |
|---|---|---|
| 5,509,947 A | 4/1996 | Burton |
| 5,559,308 A * | 9/1996 | Hayashi ................. 181/265 |
| 5,783,782 A * | 7/1998 | Sterrett et al. ........... 181/272 |
| 6,467,569 B2 * | 10/2002 | Noe et al. ............... 181/231 |
| 6,467,570 B1 * | 10/2002 | Herold ................... 181/231 |
| 6,769,511 B1 * | 8/2004 | Brooks et al. ............ 181/241 |

FOREIGN PATENT DOCUMENTS

| | | | |
|---|---|---|---|
| JP | 02241917 A | * | 9/1990 |
| JP | 8270431 A | | 10/1996 |

* cited by examiner

COMBINED SILENCER AND SPARK ARRESTER

TECHNICAL FIELD

This invention relates to a silencer for silencing exhaust gases that enables the entrapment of burning carbon particles or sparks carried in the exhaust gases, particularly for use in internal combustion engine applications where fire hazards exist.

BACKGROUND

When internal combustion engines are operated in locations requiring the removal of sparks from exhaust gases, such as in power generating sets, it can be necessary to provide a spark arrester. Conventional spark arresters work by providing an angular rotation to the flow of exhaust gases through a spark arrester chamber by means of fixed blades, thereby causing the sparks to move to the outer perimeter of the chamber. A carbon trap is generally provided at the outer wall of the chamber and traps the carbon particles and sparks. The remaining exhaust gas then passes through the exhaust gas silencer to the atmosphere.

The provision of a spark arrester to an exhaust gas silencer system can add significant cost to the system. Moreover conventional separate spark arresters are bulky and take up additional space in or near the engine. The present invention provides a silencer with an integral spark arrester, which allows a separate spark arrester to be omitted where conditions permit.

SUMMARY OF THE INVENTION

The present invention provides a silencer for silencing exhaust gases comprising an exhaust gas inlet, an exhaust gas outlet, a first chamber and a first passage having first and second ends. The first chamber and first passage are arranged between the exhaust gas inlet and the exhaust gas outlet such that exhaust gases passing from the exhaust gas inlet to the exhaust gas outlet pass from the first end to the second end of the first passage and hence through the first chamber. The second end of the first passage communicates with the first chamber. The silencer further includes at least one acoustic resonator chamber connected by a connecting passage to the first chamber. The connecting passage is positioned proximate the second end of said first passage.

From another aspect, the invention provides a method of arresting sparks in a silencer comprising the steps of:
causing exhaust gases to flow from an exhaust gas inlet to an exhaust gas outlet via a first chamber,
providing an acoustic resonator chamber connected by a connecting passage to said first chamber, and
directing the flow of exhaust gases through said first chamber such that sparks in said exhaust gases are caused to enter the acoustic resonator chamber and become trapped therein.

Other features and aspects of this invention will become apparent from the following description and the accompanying drawings.

DETAILED DESCRIPTION

Figure 2:
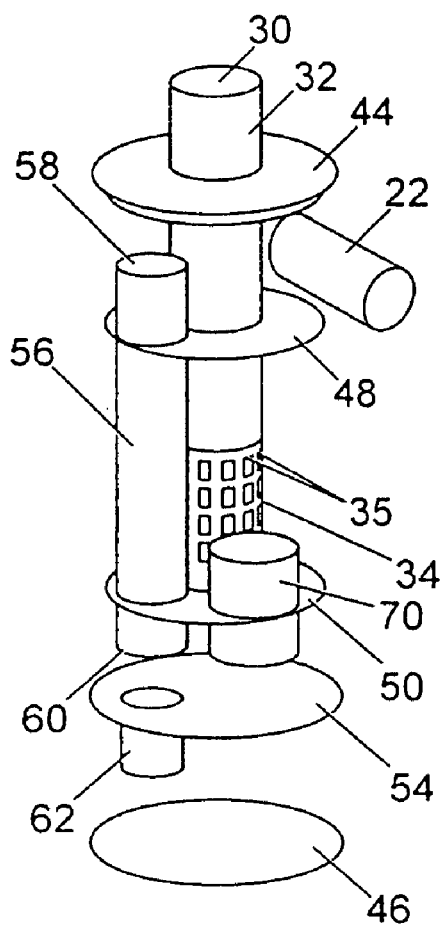
FIG. 2 is an isometric view of the silencer of FIG. 1 with the outer casing and inner lining omitted for clarity.
Figure 1:
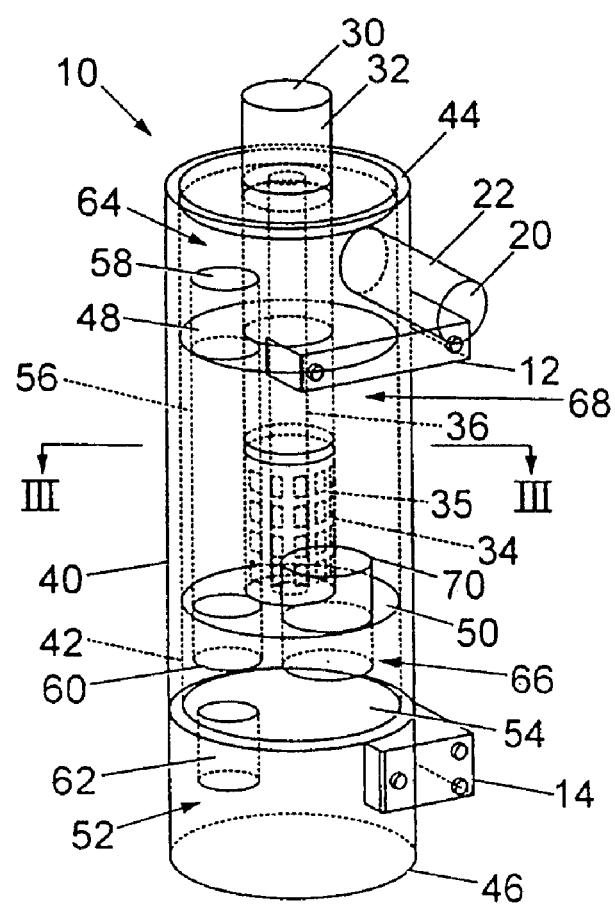
FIG. 1 is an isometric view of a silencer forming one embodiment of the invention.

One embodiment of the invention will now be described with reference to the drawings, by way of example. FIG. 1 shows a silencer 10 that is mounted to an engine (not shown) or other supporting structure by mounting brackets 12, 14. The silencer 10 includes an exhaust gas inlet 20 on a stub pipe 22 and an exhaust gas outlet 30 on an outlet pipe 32. The stub pipe 22 enters an outer casing 40 divided into a number of chambers, defined by two end caps 44, 46, two baffle plates 48, 50, a low frequency resonator plate 54 and the outer casing 40 itself, together with an inner lining 42 fixed inside the outer casing 40.

The inlet chamber 64 is defined by the inner lining 42, a first end cap 44 and a first baffle plate 48. A first end 58 of a bridge pipe or first passage 56 forming a first passage is in communication with the inlet chamber 64. A second end 60 of the bridge pipe or first passage 56 extends into and is in communication with a first chamber 66, which is defined by the inner lining 42, the low frequency resonator plate 54 and baffle plate 50.

Figure 3:
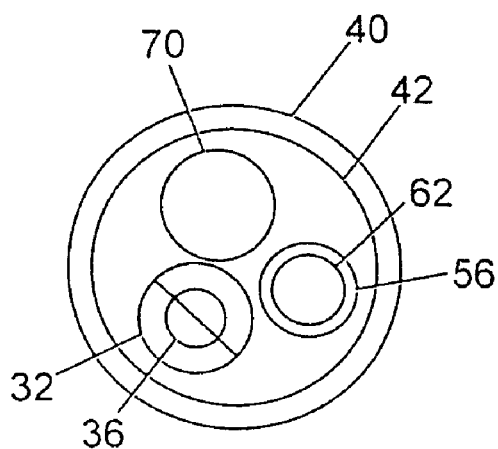
FIG. 3 is a cross-sectional view taken on the line III—III of FIG. 1.

The low frequency resonator plate 54 forms part of an acoustic resonator chamber 52, which may be of the sort commonly referred to as a Helmholtz resonator, which communicates with the first chamber 66 by means of a resonator neck pipe or connecting passage 62. The connecting passage 62 is preferably tubular and is axially aligned with the bridge pipe 56, as can be seen most clearly in FIG. 3. The entrance to the connecting passage 62 is adjacent to and directly opposite the second end 60 of the bridge pipe 56. In the illustrated embodiment the low frequency resonator plate 54 forms a boundary wall between the first chamber 66 and the acoustic resonator chamber 52.

A second chamber 68 is defined by the inner lining 42, the first baffle plate 48 and a second baffle plate 50. This second chamber 68 communicates with the first chamber 66 by means of a return pipe or return passage 70. The outlet pipe 32 also communicates with the second chamber 68 by means of a plurality of perforations 35 in a perforated portion 34 of the outlet pipe 32. The outlet pipe 32 has an absorbent pod 36 of conventional design mounted therein.

INDUSTRIAL APPLICABILITY

Figure 4:
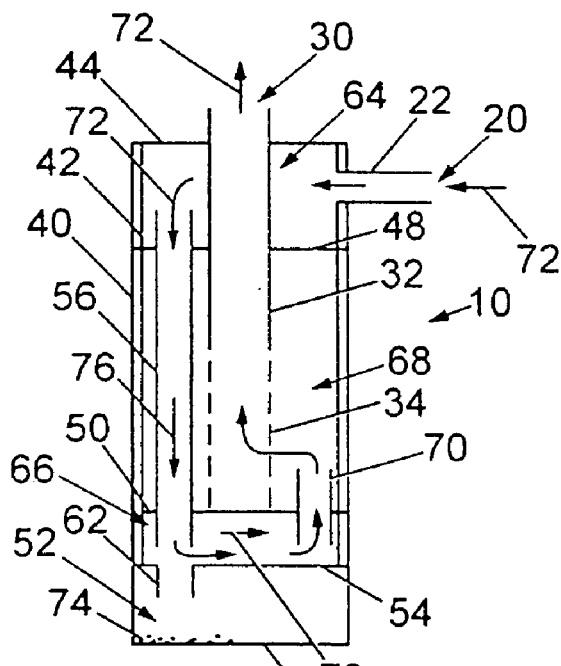
FIG. 4 is a schematic view of the silencer of FIG. 1.

The mode of operation of the silencer will most readily be understood by reference to FIG. 4, which shows the flow of exhaust gases through the silencer 10 by means of arrows 72. The exhaust gases enter the silencer 10 through the exhaust gas inlet 20 and enter the inlet chamber 64. From here the gases pass along the first passage 56 to the first chamber 66, which is adjacent to the acoustic resonator chamber 52. The acoustic resonator chamber 52 provides a silencing function, as will be understood by those skilled in the art. The size, materials and other parameters of the low frequency resonator plate 54 and other components of the resonator chamber 52 are selected by the engine designer in accordance with the requirements of the particular engine with which the silencer 10 is to be used, in a manner understood by those skilled in the art.

The first chamber 66 serves to reverse the flow of the exhaust gases, which enter in a first direction 76 through the first passage 56, are deflected through 90° in a second direction 78 and leave in a direction opposite to the first direction 76 through the return passage 70. However, any burning carbon particles or sparks 74 carried by the exhaust gases continue under their own momentum in a substantially straight line through the connecting passage 62 and into the acoustic resonator chamber 52. Because the acoustic resonator chamber 52 is a closed chamber having only one inlet 62, there is not a substantial flow of exhaust gases into or out of the resonator chamber 52, so that the carbon particles 74 remain in the chamber 52. The resonator chamber 52 may be provided with an access cover (not shown) to allow periodic removal of accumulated carbon particles 74 during operation of the silencer. For best results the connecting passage 62 should be positioned proximate the second end 60 of the first passage 56. It has been found that particularly good results are obtained when the connecting passage 62 is substantially axially aligned with the second end 60 of the first passage 56.

As described above, the exhaust gases leave the first chamber 66 by means of the return passage 70. They then enter the second chamber 68, and pass through the perforations 35 in the perforated portion 34 of the outlet pipe 32 before exiting to the atmosphere through the exhaust gas outlet 30. The operation of perforated pipes in silencers is well known to those skilled in the art, and is not described further here.

The invention provides a silencer in which the flow of exhaust gases is directed through a chamber 66 in the silencer 10 such that sparks in the exhaust gases are caused to enter the acoustic resonator chamber 52 and become trapped therein. The silencer according to the invention combines a spark arrester with a silencer, so that it is not necessary to provide a separate spark arrester for exhaust gases to flow through either before or after the silencer. This makes possible cost and assembly time savings, as well as saving space within the engine. The invention has particular benefit in power generating sets, where regulations may require spark control. In the engines associated with such power generating sets a single silencer according to the invention can replace a silencer and a separate spark arrester, offering significant cost savings.

It is to be understood that the particular arrangement of passages and chambers shown in the illustrated embodiment is by way of example only, and other arrangements of passages and chambers are envisaged. For example the first chamber 66 may be arranged to redirect the flow of exhaust gases by an angle other than 180° or by a series of intermediate angles, and the silencer may contain a greater or smaller number of passages and chambers in total. Although the illustrated embodiment shows only one acoustic resonator chamber 52, there may be more than one such chamber. The acoustic resonator chamber 52 may take a form other than that illustrated in the Figures, and is not limited to a Helmholtz resonator. Other modifications to the invention are possible within the scope of the appended claims.

What is claimed is:

1. A silencer for silencing exhaust gases and for enabling the entrapment of burning carbon particles or sparks carried by the exhaust gases, comprising an exhaust gas inlet, an exhaust gas outlet, a first chamber, a first passage having first and second ends, and at least one acoustic resonator chamber, the first chamber and first passage being arranged such that exhaust gases passing from said exhaust gas inlet to said exhaust gas outlet pass from the first end of said first passage to the second end of said first passage and hence through said first chamber, wherein the second end of said first passage communicates with said first chamber without a substantial flow of exhaust gases into or out of the at least one acoustic resonator chamber, wherein the at least one acoustic resonator chamber is connected by a connecting passage to said first chamber, and wherein the second end of the first passage extends into the first chamber to a position proximate the connecting passage to permit entrapment of burning carbon particles or sparks carried in the exhaust gases.

2. A silencer according to claim 1, wherein the connecting passage is substantially axially aligned with the second end of said first passage.

3. A silencer according to claim 1, wherein the first chamber is arranged so as to reverse the flow of exhaust gases passing through said first chamber.

4. A silencer according to claim 2, wherein the first chamber is arranged so as to reverse the flow of exhaust gases passing through said first chamber.

5. A silencer according to claim 1, wherein the connecting passage comprises a tubular member extending into the acoustic resonator chamber, the connecting passage being the only opening to the acoustic resonator chamber.

6. A silencer according to claim 2, wherein the connecting passage comprises a tubular member extending into the acoustic resonator chamber, the connecting passage being the only opening to the acoustic resonator chamber.

7. A silencer according to claim 1, wherein the acoustic resonator chamber includes a low frequency resonator plate that forms a boundary wall between the first chamber and the acoustic resonator chamber.

8. A silencer according to claim 2, wherein the acoustic resonator chamber includes a low frequency resonator plate that forms a boundary wall between the first chamber and the acoustic resonator chamber.

9. A silencer according to claim 7, wherein the connecting passage passes through an aperture in the low frequency resonator plate.

10. A silencer according to claim 8, wherein the connecting passage passes through an aperture in the low frequency resonator plate.

11. A silencer according to claim 1, further including a return passage and a second chamber, arranged such that exhaust gases pass from the first chamber through the return passage to a second chamber.

12. A silencer according to claim 2, further including a return passage and a second chamber, arranged such that exhaust gases pass from the first chamber through the return passage to a second chamber.

13. A silencer according to claim 11, further including an outlet pipe having said exhaust gas outlet at a distal end thereof, arranged such that exhaust gases pass from the second chamber through the outlet pipe to the exhaust gas outlet.

14. A silencer according to claim 12, further including an outlet pipe having said exhaust gas outlet at a distal end thereof, arranged such that exhaust gases pass from the second chamber through the outlet pipe to the exhaust gas outlet.

15. A silencer according to claim 13, wherein the outlet pipe is provided with perforations over a portion of its length and communicates with said second chamber via said perforations.

16. A silencer according to claim 14, wherein the outlet pipe is provided with perforations over a portion of its length and communicates with said second chamber via said perforations.

17. A method of arresting burning carbon particles or sparks in a silencer comprising:

causing exhaust gases to flow from an exhaust gas inlet to an exhaust gas outlet via a first chamber, providing an acoustic resonator chamber connected by a connecting passage to said first chamber, and directing the flow of exhaust gases through said first chamber such that burning carbon particles or sparks in said exhaust gases are caused to enter the acoustic resonator chamber and become trapped therein.

18. A method according to claim 17, wherein the flow of exhaust gases is directed from a first direction to a second direction, while burning carbon particles or sparks in said exhaust gases continue in the first direction into the acoustic resonator chamber.

19. A method according to claim 17, wherein the flow of exhaust gases is directed along a first passage into said first chamber such that burning carbon particles or sparks in said exhaust gases are caused to enter the acoustic resonator chamber via the connecting passage provided adjacent to the first passage.

20. A method according to claim 18, wherein the flow of exhaust gases is directed along a first passage into said first chamber such that burning carbon particles or sparks in said exhaust gases are caused to enter the acoustic resonator chamber via the connecting passage provided adjacent to the first passage.

21. The method according to claim 17 wherein directing the flow of exhaust gases includes directing the flow of exhaust gases along a first passage having an end substantially axially aligned with the connecting passage.

22. The method according to claim 18 wherein directing the flow of exhaust gases includes directing the flow of exhaust gases along a first passage having an end substantially axially aligned with the connecting passage.

23. The silencer according to claim 1 wherein the connecting passage is positioned such that burning carbon particles or sparks in the exhaust gases passing from the first end of said first passage to the second end of said first passage enter the acoustic resonator chamber through the connecting passage.

24. The silencer according to claim 2 wherein the connecting passage is positioned such that burning carbon particles or sparks in the exhaust gases passing from the first end of said first passage to the second end of said first passage enter the acoustic resonator chamber through the connecting passage.

25. A silencer for silencing exhaust gases and trapping burning carbon particles or sparks carried in the exhaust gases, comprising:

an exhaust gas inlet;

an exhaust gas outlet;

a first chamber and a first passage having first and second ends, the first chamber and first passage being arranged such that exhaust gases passing from said exhaust gas inlet to said exhaust gas outlet pass from the first end of said first passage to the second end of said first passage and hence through said first chamber, the second end of said first passage communicating with and extending into said first chamber, the first chamber being arranged so as to reverse the flow of exhaust gases passing through said first chamber;

at least one acoustic resonator chamber connected by a connecting passage to said first chamber such that burning carbon particles or sparks in the exhaust gases passing from the first end of said first passage to the second end of said first passage enter the acoustic resonator chamber through the connecting passage, the connecting passage being positioned proximate the second end of said first passage and being substantially axially aligned with the second end of said first passage, wherein the connecting passage comprises a tubular member extending into the acoustic resonator chamber, the connecting passage being the only opening to the acoustic resonator chamber, the acoustic resonator chamber including a low frequency resonator plate that forms a boundary wall between the first chamber and the acoustic resonator chamber, the connecting passage passing through an aperture in the low frequency resonator plate;

a return passage and a second chamber, arranged such that exhaust gases pass from the first chamber through the return passage to a second chamber; and an outlet pipe having said exhaust gas outlet at a distal end thereof, arranged such that exhaust gases pass from the second chamber through the outlet pipe to the exhaust gas outlet, the outlet pipe being provided with perforations over a portion of its length, the outlet pipe communicating with said second chamber via said perforations.

* * * * *